United States Patent [19]

Patel

[11] Patent Number: 4,650,500
[45] Date of Patent: Mar. 17, 1987

[54] ENHANCED PRESSURE SWING ADSORPTION PROCESS AND SYSTEM

[75] Inventor: Kirit M. Patel, Hopewell Junction, N.Y.

[73] Assignee: Union Carbide Corporation, Danbury, Conn.

[21] Appl. No.: 704,547

[22] Filed: Feb. 22, 1985

[51] Int. Cl.⁴ ............................................. B01D 53/04
[52] U.S. Cl. ......................................... 55/26; 55/62; 55/68
[58] Field of Search .................. 55/25, 26, 31, 33, 35, 55/58, 62, 68, 75, 179, 389

[56] References Cited

U.S. PATENT DOCUMENTS

| | | | |
|---|---|---|---|
| 3,430,418 | 3/1969 | Wagner | 55/25 |
| 3,986,849 | 10/1976 | Fuderer et al. | 55/25 |
| 4,340,398 | 7/1982 | Doshi et al. | 55/25 |
| 4,371,380 | 2/1983 | Benkmann | 55/26 |
| 4,381,189 | 4/1983 | Fuderer | 55/26 |
| 4,461,630 | 7/1984 | Cassidy et al. | 55/25 |
| 4,468,237 | 8/1984 | Fuderer | 55/26 |
| 4,482,361 | 11/1984 | Whysall | 55/26 |
| 4,512,778 | 4/1985 | Simonet et al. | 55/26 |
| 4,512,780 | 4/1985 | Fuderer | 55/26 |

*Primary Examiner*—Robert Spitzer
*Attorney, Agent, or Firm*—Morris N. Reinisch

[57] ABSTRACT

The number of beds on the adsorption step of a pressure swing adsorption cycle is varied cyclically throughout the cycle. As a result, the final bed repressurization step is separated from the partial repressurization-pressure equalization step, thereby enhancing product recovery, without discontinuity in the flow of product effluent from the adsorption system or the use of an external repressurization storage tank.

17 Claims, No Drawings

ENHANCED PRESSURE SWING ADSORPTION PROCESS AND SYSTEM

BACKGROUND OF THE INVENTION

1. Field of the Invention

The invention relates to the purification of gases in a pressure swing adsorption system. More particularly, it relates to the improvement of product gas recovery in such a system.

2. Description of the Prior Art

The pressure swing adsorption (PSA) process provides a highly desirable means for separating and purifying at least one gas component from a feed gas mixture of said gas component and at least one selectively adsorbable component. Adsorption occurs in an adsorbent bed at a higher adsorption pressure, with the selectively adsorbable component thereafter being desorbed by pressure reduction to a lower desorption pressure. The PSA process is commonly employed in multi-bed systems. The Wagner patent, U.S. Pat. No. 3,430,418, discloses a PSA process and system employing at least four adsorption beds arranged for carrying out the PSA processing sequence on a cyclic basis. This sequence includes higher pressure adsorption, cocurrent depressurization to intermediate pressure with release of void space gas from the product end of the bed, countercurrent depressurization to a lower desorption pressure, and repressurization to the higher adsorption pressure. Wagner teaches the passing of the released void space gas from one bed directly to another bed initially at its lower desorption pressure. The pressure in the two beds is thereby equalized at an intermediate pressure, after which additional void space gas is released from the one bed as it is depressurized to a lower pressure. The other bed is further repressurized from the intermediate pressure to its higher adsorption pressure at least in part by the countercurrent addition of product effluent to the product end of the bed being repressurized.

In a further development of the art, the Fuderer patent, U.S. Pat. No. 3,986,849, discloses the use of at least seven adsorbent beds, with the feed gas mixture being introduced to the feed end of at least two adsorbent beds, in overlapping identical processing cycles, at all stages of the PSA processing sequence. It is known in the art that advantages can be achieved in particular embodiments by employing a second pressure equalization step in addition to that referred to above. By such a step, a bed undergoing repressurization is further pressure equalized with the void space gas from another bed to a higher intermediate pressure subsequent to the pressure equalization of the bed from its initial desorption pressure to an initial intermediate pressure. In accordance with the Fuderer teaching, each bed, in turn, undergoes three pressure equalization steps prior to final repressurization to the higher adsorption pressure. Fuderer also discloses the carrying out of the three pressure equalization steps in a particular manner to achieve higher product purity by substantially avoiding the impurity profile reversion that can occur upon pressure equalization between the beds, as discussed in the patent. It is also within the contemplation of the art to employ, in some circumstances, a fourth pressure equalization step prior to final repressurization with product effluent.

The PSA process is generally carried in multibed systems so as to provide a substantially uniform flow of product effluent from the adsorption system. A portion of the product effluent withdrawn from a bed or beds undergoing adsorption at higher pressure is employed for repressurization of other beds of the system. As is taught by Wagner, the last part of the repressurization is performed only with the product effluent. To avoid any discontinuity in the substantially uniform flow of product effluent in the product manifold leading from the overall PSA system, it is conventional practice to continually withdraw a portion of the product effluent from repressurization purposes.

As a result of the repressurization of the bed initially at lower pressure simultaneously by both product effluent gas and void space gas released from another bed, it has been recognized that a somewhat lower recovery of product is achieved than would result in the event such simultaneous repressurization were not required in practical commercial operations. This effect becomes more pronounced at the appreciable higher repressurization rates applicable as the number of beds in the PSA system is increased, resulting in an increase in the amount of product gas unrecovered from each bed and subsequently lost upon countercurrent depressurization and purge. Such a loss of product gas, while tolerable in light of the overall requirements of commercial embodiments of the PSA process and system is nevertheless undesired, and its avoidance would present a further advance in the art.

It is an object of the invention, therefore, to provide an improved PSA process and system.

It is another object of the invention to provide a PSA process and system having improved product recovery.

With these and other objects in mind, the invention is hereinafter described in detail, the novel features thereof being particularly pointed out in the appended claims.

SUMMARY OF THE INVENTION

Feed gas is introduced to the PSA system having at least four beds therein such that the number of beds on the high pressure adsorption step at any given time varies cyclically between "n" and "n−1" where "n" is equal to or greater than 2. The adsorption time per cycle is the same in each bed, so that each bed in the system receives the same number of feed moles/cycle.

DETAILED DESCRIPTION OF THE INVENTION

The objects of the invention are accomplished by thus varying the number of beds on the higher pressure adsorption step at any given time. The same broad objects have been accomplished, it should be noted, by the invention of the Doshi et al patent U.S. Pat. No. 4,340,398, issued July 20, 1982. In the practice of said patented invention, a portion of the product effluent is withdrawn from a bed at higher adsorption pressure during pressure equalization between a bed undergoing cocurrent depressurization with release of void space gas from the product end thereof and a bed initially at a lower pressure. Such portion of product effluent, however, is not passed to a bed initially at lower pressure simultaneously with the passage of void space gas thereto for repressurization by pressure equalization as in the conventional practice referred to above. Rather such portion of product effluent is passed to an external repressurization tank, from which product effluent is passed for final repressurization of a bed upon completion of the pressure equalization step in that bed. Product recovery is improved by the patented approach over that obtainable in conventional practice without discontinuity in the substantially uniform flow of product effluent from the adsorption system. The invention herein disclosed and claimed likewise enables product recovery to be enhanced without discontinuity in the substantially uniform flow of product effluent from the adsorption system. In the practice of the invention, however, such desirable results are achieved without the necessity for employing an external repressurization tank in the system and for passing a portion of the product effluent to such an external tank during partial repressurization of a bed by pressure equalization, as in the patented approach to avoid discontinuity of product effluent flow from the system. Thus, the overall PSA process and system are enhanced by the elimination of the need for employing such an external repressurization tank adapted for storing product effluent at the higher adsorption process level, while nevertheless obtaining the advantageous improvement in product recovery achieved by the patented approach at the equipment cost penalty associated with the use of an external repressurization tank.

The invention can be practiced in PSA systems having at least four adsorbent beds. Each bed in the system undergoes, on a cyclic basis, high pressure adsorption, cocurrent depressurization to intermediate pressure with release of void space gas from the product end of the bed, countercurrent depressurization and/or purge to a lower desorption pressure with release of gas from the feed end of the bed, and repressurization to said higher pressure. For some embodiments, it is convenient to employ from four to six adsorbent beds, while for other embodiments, it is advantageous to employ at least seven adsorbent beds. While systems of up to 12-14 adsorbent beds may be desired for various applications and up to 16-18 beds or more may be feasible for certain gas separation operations, it is particularly useful to provide nine or ten bed systems for various applications.

It is well established in the art that void space gas released from one bed upon the cocurrent depressurization thereof is passed to the product end of another bed in the system initially at a lower pressure to equalize the pressure therebetween. In four-bed systems, it is convenient to employ one such pressure equalization step in the overall PSA processing cycle, whereas five-bed systems may conveniently employ one or two such pressure equalizations and six-bed systems will generally employ two pressure equalization steps. In systems having seven or more adsorbent beds, at least two pressure equalization steps will typically be employed, with three such steps or even more being desirable particularly as the number of beds in the system increases.

While it is within the scope of the invention to employ either a countercurrent depressurization step or a purge step, with gas being withdrawn from the feed end of the bed down to a lower desorption pressure level, it is generally preferred practice to employ both a countercurrent depressurization and a purge step in the cycle. It should be noted that the purge step can be carried out prior to countercurrent depressurization and even before the last of the pressure equalization steps carried out in a given PSA cycle. It is generally preferred, however, to employ the purge step following countercurrent depressurization to lower desorption pressure. The purge gas for each bed is commonly provided by the release of void space gas upon cocurrent depressurization of another bed apart from such cocurrent depressurization in which the released void space gas is used for pressure equalization purposes.

In the practice of the PSA technology as taught by the patents indicated above, the number of beds in the system, the number of beds on the higher pressure adsorption step at any given time in the cycle, and the number of pressure equalization steps will all vary from case-to-case depending upon the overall requirements of any given application. Contrary to such established practice, the invention provides that the feed gas mixture is introduced to the adsorption system such that the number of beds on the higher pressure adsorption step, at any given time in the cycle, does not remain constant but varies cyclically between "n" and "n−1" where "n" is equal to or greater than 2. The cyclical variation in the number of beds on adsorption will be understood to comprise a regular repetitive variation between n and n−1 at uniform increments of time such that the adsorption time for cycle is the same in each bed and that each bed receives the same number of feed moles per cycle. In four- or five-bed systems, n will be 2, with the number of beds on adsorption thus varying cyclically between 2 and 1 throughout in overall processing cycle or period of time in the operation of the system. Six-bed systems will generally have an n value of 2 or 3, as will systems having a higher number of beds although it will be appeciated that n can conveniently be made larger as the number of beds employed in the system increases. With such variation in the number of beds on the adsorption step at any given time, the practice of the invention desirably includes the passing of a portion of the product effluent withdrawn from a bed undergoing adsorption at the higher adsorption level directly to a bed undergoing repressurization for final repressurization to said higher adsorption level upon completion of partial repressurization of the bed being repressurized to an intermediate pressure level by one or more pressure equalization steps. The invention enables a substantially uniform flow of product effluent to be withdrawn from the adsorption system without the necessity for passing a portion of the product effluent directly to the bed undergoing repressurization during said partial repressurization thereof by pressure equalization. Contrary to the requirement of Doshi et al patent, U.S. Pat. No. 4,340,398, the practice of invention further advantageously avoids the necessity for passage of a portion of the product effluent to an external repressurization tank during the partial repressurization of a bed by pressure equalization. The invention thus enables product recovery to be enhanced by separating the pressure equalization and final repressurization steps without discontinuity in the substantially uniform flow of product effluent from the adsorption system and without the passage of a portion of the product effluent to such an external tank during partial repressurization of a bed by pressure equalization for purposes of avoiding such discontinuity of product effluent flow.

In four- to six-bed systems, a desirable overall processing cycle, with the number of beds on adsorption varying cyclically between 2 and 1, comprises (a) higher pressure adsorption, with passage of the feed gas mixture to the feed end of the bed and withdrawal of product effluent from the product end thereof; (b) cocurrent depressurization—direct pressure equalization with another bed to an upper intermediate pressure; (c) cocurrent depressurization—direct pressure equalization with a different bed to an intermediate pressure;

(d) cocurrent depressurization to a lower intermediate pressure with the released void space gas being used to provide purge gas to a bed to be purged; (e) countercurrent depressurization to lower adsorption pressure; (f) purge at said lower desorption pressure; (g) pressure equalization with other beds for the partial repressurization thereof to said intermediate and said upper intermediate pressure levels; and (h) final repressurization from said upper pressure to said higher adsorption pressure. As indicated above, it is generally desirable to include in the processing cycle three cocurrent depressurization steps in which void space gas released from the product end of a bed is passed to other beds for pressure equalization purposes at intermediate pressure levels when the PSA systems have at least seven adsorbent beds. It is also generally desirable to include an additional cocurrent depressurization step in which void space gas released from the product end of the bed is used to provide purge gas to a bed to be purged prior to repressurization. In generally preferred operations, the cocurrent depressurization—provide purge gas step is carried out subsequent to the third of the cocurrent depressurization—pressure equalization steps and prior to the commencement of the countercurrent depressurization step in the bed. As indicated above, the purge step in any bed is commonly carried out upon completion of the countercurrent depressurization step in that bed and before it is partially repressurized by pressure equalization with another bed.

The invention is further described below with respect to an illustrative example of an embodiment having ten adsorbent beds operated on a cyclic basis in accordance with the overall processing cycle shown in the Table. It will be appreciated that the invention should not be construed as being limited by the particular features of the process and system of the example, which relates simply to one desirable embodiment serving to demonstrate the operation of the PSA process and system in accordance with the invention as disclosed herein and recited in the claims.

pressure; P represents a purge step at lower adsorption pressure; and R represents repressurization to the higher adsorption pressure. It will be seen that the number of beds on the adsorption step A varies cyclically between 3 and 2 at equal increments of time throughout the processing cycle. In addition, it will be seen that the adsorption time per cycle is the same in each bed so that each bed receives the same number of feed moles/cycle. R is accomplished by diverting a portion of the product effluent withdrawn from each bed during adsorption step A and passing from the system at higher adsorption pressure for passage to a bed upon completion of partial repressurization by pressure equalization steps 3, 2 and 1, respectively. It will be appreciated from the processing cycle illustrated in the Table that the portion of product effluent gas used for repressurization can be passed to the bed being repressurized on a continuous basis. During the other processing steps in bed 1, beds 2 through 10, in turn, will be seen to undergo repressurization step R for equal increments of time, after which bed 1 is repressurized for the same increment of time. Thus, the repressurization portion of the overall cycle can be carried out on a continuous cyclic basis without having to pass the portion of product effluent directly to the bed undergoing repressurization during the partial repressurization thereof by pressure equalization and without the passage of a portion of the product effluent to an external repressurization storage tank during the partial repressurization of a bed by pressure equalization, while nevertheless maintaining a substantially uniform flow of product effluent from the adsorption system without the discontinuity or sacrifice in product recovery required in the prior art approaches. In the illustrated ten-bed cycle, it will be seen that the adsorption step A, in which the feed gas mixture is passed to the bed at higher adsorption pressure and product effluent is withdrawn therefrom at said pressure level, has a step time of 25% of the total cycle time in each bed. Said practice of the invention can result in a significant improvement in product recovery, with an

TABLE

| Bed No. | Cycle |
|---|---|
| 1 | A / 1 / 2 / 3 / PP / BD / P / 3 / 2 / 1 / R |
| 2 | R / A / 1 / 2 / 3 / PP / BD / P / 3 / 2 / 1 |
| 3 | 3 / 2 / 1 / R / A / 1 / 2 / 3 / PP / BD / P / B |
| 4 | P / 3 / 2 / 1 / R / A / 1 / 2 / 3 / PP / BD / P |
| 5 | P / 3 / 2 / 1 / R / A / 1 / 2 / 3 / PP / BD |
| 6 | PP / BD / P / 3 / 2 / 1 / R / A / 1 / 2 / 3 / PP |
| 7 | PP / BD / P / 3 / 2 / 1 / R / A / 1 / 2 / 3 |
| 8 | 2 / 3 / PP / BD / P / 3 / 2 / 1 / R / A / 1 |
| 9 | A / 1 / 2 / 3 / PP / BD / P / 3 / 2 / 1 / R / A |
| 10 | A / 1 / 2 / 3 / PP / BD / P / 3 / 2 / 1 / R / A |

In the Table, relating to a ten-bed system employing three cocurrent depressurization—pressure equalization steps and one cocurrent depressurization—provide purge step, A represents higher pressure adsorption; the numerals 1, 2 and 3 represent the first, second and third cocurrent depressurization—direct pressure equalization steps, respectively, between a bed that has completed its adsorption step at higher adsorption pressure and beds being repressurized; PP represents a cocurrent depressurization—provide purge gas step in which released void space gas is passed directly to another bed for purge purposes; BD represents a countercurrent depressurization or blowdown step to lower desorption improvement of 1% to 2% being feasible in certain practical applications depending upon the separation to be achieved and the operating conditions employed in such applications. The incremental costs associated with the practice of the invention have been found to be very small. No additional apparatus hardware is required for the practice of the invention over and above that employed in conventional PSA units, and the invention can be easily applied to existing PSA units with only a small change in the applicable control software.

The PSA process and system of the invention can be employed to selectively adsorb at least one more readily adsorbable component from a feed gas mixture containing said component and a less readily adsorbable component on a highly advantageous practical basis. Thus, a desired product effluent gas comprising the less readily adsorbable component can be separated from commercially available feed gas mixtures and purified in desirable commercial applications enhanced by the practice of the invention. For example, the invention can be used for the separation and purification of less readily adsorbable hydrogen present as a major component of a feed gas mixture also containing carbon dioxide as a selectively more readily adsorbable component, typically together with one or more additional minor components to be removed as undesired impurities, e.g., nitrogen, argon, carbon monoxide, light saturated and unsaturated hydrocarbons, aromatics, light sulfur compounds and the like. Those skilled in the art will appreciate that the invention can also be employed for other desirable separations, such as the separation and purification of methane from mixtures thereof with carbon dioxide, ammonia, hydrogen sulfide and the like, and air separation applications.

In practicing the invention, it will be appreciated that the PSA systems employed will necessarily incorporate various conduits, valves, and other control features to accomplish the necessary switching of the adsorbent beds from one processing step to the next in appropriate sequence. Conventional conduits and control features known in the art are employed for such purposes. Conduit means are thus provided for introducing the feed gas mixture to the adsorption system, such means being adapted to provide for the variation of the number of beds on the higher pressure adsorption step, cyclically, between n and n−1, where n is equal to or greater than 2 throughout the processing cycle in the system, with the cycle being controlled, as illustrated in the Table, such that each bed has the same adsorption time per cycle. Control means are provided for passing the portion of the product effluent recycled for repressurization purposes to a bed undergoing repressurization upon completion of partial repressurization by pressure equalization. In the apparatus of the invention, adapted for the carrying out of a particular cycle in accordance with the teachings above, a portion of the product effluent gas being recycled for repressurization purposes is not controlled to pass to a bed during partial repressurization by pressure equalization. Nor in an external repressurization storage tank utilized for the storage of product effluent during said pressure equalization step. To the contrary, said control means enable a substantially uniform flow of product effluent from the adsorption system while the portion thereof required for bed repressurization is passed, in turn, directly to each bed in the system during repressurization step R in said bed.

It will be appreciated that various changes and modifications can be made in the invention described herein without departing from the scope of the invention as set forth in the claims. As described above, the gas separation desired, the number of beds in the system, the number of beds on adsorption, i.e., n and n−1, the number of pressure equalizations employed, the inclusion or not of a purge step, all can be varied depending upon the particular circumstances of a given application. In addition, it should be noted that, while the invention has been described with respect to embodiments employing direct pressure equalization and purge steps in which gas is passed directly from one adsorbent bed to another, it is also within the scope of the invention to employ indirect pressure equalization and provide purge steps in which cocurrent depressurization gas is passed to external tanks for passage therefrom to particular beds in the system in accordance with particular PSA processing cycles. It is also known in the art to employ combinations of direct and indirect pressure equalizations and provide purge steps, and the particular sequence of such steps is not critical to the invention provided that the number of beds on adsorption is varied cyclically to obtain the desired improvement in product recovery over conventional practice without resort to the external repressurization storage tanks of the Doshi et al patent. Those skilled in the art will appreciate that the operating conditions, e.g., higher adsorption pressure, lower desorption pressure and intermediate pressure levels, can vary from application to application, as can the selective adsorbent employed for a given gas separation. The particular adsorbent employed for any given gas separation operation will depend, of course, upon the particular separation being carried out, with the adsorbent having a selectivity for one component of a feed gas mixture over another, as typically for the impurity component over the desired product component. Suitable adsorbents well known in the art include zeolite molecular sieves, activated carbon, silica gel, activated alumina and the like. Zeolite molecular sieves are generally desirable adsorbents in the separation and purification of hydrogen contained in mixtures thereof with carbon dioxide, nitrogen and the like. It will be appreciated also that the benefits of the invention, described in terms of enhanced product recovery without the need for providing an additional external repressurization storage tank and related equipment, can apply to enhanced purity at a given product recovery level, or to a combination of enhanced purity and recovery, and not merely to enhanced product recovery at a given purity level although the latter characterization is more commonly perceived in describing the benefits obtained in the practice of the invention.

The Doshi et al patent refers to the loss of product gas as being tolerable, in conventional PSA processing, because of the overriding desire to avoid a discontinuity in the substantially uniform flow of product effluent from a PSA system. As such a loss is nevertheless undesired, Doshi et al provided an improved PSA process and system wherein product effluent gas recycled from repressurization purposes is diverted to an external repressurization storage tank during pressure equalization in the bed being repressurized and is passed from the external tank to said bed upon completion of the pressure equalization step. The patent approach serves to enhance product recovery without discontinuity in the substantially uniform flow of product effluent from the system, but at the cost penalty of the necessity for producing a higher pressure external storage tank and associated equipment. The invention herein disclosed and claimed provides an appreciable additional advantage in the art, combining the desirable results of Doshi et al with the elimination of the need to employ such an external repressurization storage tank to achieve the desired benefits. In this manner, the invention enables a significant advance to be made in the continuing effort to enhance the benefits of the highly desirable pressure swing adsorption technology and its application to practical, commercial gas separation operations.

I claim:

1. In a pressure swing adsorption process for selective adsorption of at least one gas component from a feed gas mixture in an adsorption system having at least four adsorbent beds, each of which has a feed end and a product end, said adsorbent beds each undergoing, on a cyclic basis, high pressure adsorption to produce a product effluent, cocurrent depressurization to an intermediate pressure with release of void space gas from the bed, countercurrent depressurization and/or purge to a lower desorption pressure, and repressurization to said high pressure, wherein void space gas released from one bed undergoing said depressurization is passed to the product end of a different bed in the system initially at a lower pressure and undergoing said repressurization to equalize the pressure therebetween, said different bed also being repressurized by a portion of the product effluent withdrawn from a bed undergoing high pressure adsorption, the improvement comprising:

(a) introducing said feed gas mixture to the adsorption system such that the number of beds undergoing high pressure adsorption at any given time varies cyclically between n and n−1, where n is equal to or greater than 2 throughout each processing cycle of the system, with the adsorption time per cycle being the same in each bed so that each bed receives an equal number of feed moles/cycle;

(b) passing a portion of the product effluent withdrawn from a bed undergoing adsorption at said high pressure directly to a bed undergoing repressurization for final repressurization to said higher pressure adsorption level upon completion of partial repressurization thereof to the intermediate pressure by pressure equalization without passing a portion of the product effluent directly to the bed while it is undergoing repressurization by pressure equalization and without passing a portion of the product effluent to an external repressurization storage tank during said partial repressurization of a bed by pressure equalization; and (c) withdrawing a substantially uniform flow of product effluent from the adsorption system, whereby product recovery is enhanced.

2. The process of claim 1 in which said adsorption system comprises four to six adsorbent beds, with n being 2.

3. The process of claim 2 in which the product effluent comprises purified hydrogen.

4. The process of claim 2 in which said processing cycle in each adsorbent bed comprises:

(a) high pressure adsorption with passage of said feed gas mixture to the feed end of the bed and withdrawal of product effluent from the product end thereof;

(b) cocurrent depressurization—direct pressure equalization with another bed to an upper intermediate pressure;

(c) cocurrent depressurization—direct pressure equalization with a different bed to an intermediate pressure;

(d) cocurrent depressurization to a lower intermediate pressure with the released void space gas being used to provide purge gas to a bed to be purged;

(e) countercurrent depressurization to a lower desorption pressure;

(f) purge at said lower desorption pressure;

(g) pressure equalization with other beds for the partial repressurization thereof to said intermediate and said upper intermediate pressure levels; and (h) final repressurization from said upper intermediate pressure to said higher adsorption pressure.

5. The process of claim 4 in which said product effluent comprises purified hydrogen.

6. The process of claim 1 in which said adsorption system comprises at least seven adsorbent beds.

7. The process of claim 6 in which n is 2.

8. The process of claim 6 in which said processing cycle includes three cocurrent depressurization steps in which void space gas released from the product end of the bed is passed to other beds for pressure equalization purposes at intermediate pressure levels.

9. The process of claim 8 further including a cocurrent depressurization step in which void space gas released from the product end of the bed is used to provide purge gas to a bed to be purged prior to repressurization.

10. The process of claim 8 in which the product effluent comprises purified hydrogen.

11. The process of claim 8 in which n is 2.

12. The process of claim 8 in which n is 3.

13. The process of claim 12 further including a cocurrent depressurization step in which void space gas released from the product end of the bed is used to provide purge gas to a bed to be purged prior to repressurization.

14. The process of claim 13 in which said cocurrent depressurization—provide purge gas step is carried out subsequent to the third of said cocurrent depressurization—pressure equalization steps and prior to commencement of said countercurrent depressurization step.

15. The process of claim 14 in which said adsorption system comprises ten beds.

16. The process of claim 14 in which said adsorption system comprises nine beds.

17. The process of claim 15 in which said high pressure adsorption step is carried out for about 25% of the total cycle time in each bed.

* * * * *